United States Patent [19]

van Nes et al.

[11] 4,222,642

[45] Sep. 16, 1980

[54] EXPOSURE DEVICE FOR THE MANUFACTURE OF CATHODE-RAY TUBES FOR DISPLAYING COLORED PICTURES AND CATHODE-RAY TUBE MANUFACTURED BY MEANS OF SUCH A DEVICE

[75] Inventors: Johannes C. A. van Nes; Herman F. van Heek, both of Eindhoven, Netherlands

[73] Assignee: U.S. Philips Corporation, New York, N.Y.

[21] Appl. No.: 751,367

[22] Filed: Dec. 16, 1976

[30] Foreign Application Priority Data

Dec. 31, 1975 [NL] Netherlands ........................ 7515224

[51] Int. Cl.$^3$ ............................................ G03B 41/00

[52] U.S. Cl. ........................................................ 354/1

[58] Field of Search .................... 354/1; 313/110, 113, 313/117

[56] References Cited

U.S. PATENT DOCUMENTS

| | | | |
|---|---|---|---|
| 3,587,417 | 6/1971 | Balder et al. | 354/1 |
| 3,767,956 | 10/1973 | Bauer | 313/313 X |
| 3,780,629 | 12/1973 | Barten et al. | 354/1 |
| 4,025,811 | 5/1977 | Van Nes | 354/1 X |

*Primary Examiner*—John Gonzales

*Attorney, Agent, or Firm*—Simon L. Cohen

[57] ABSTRACT

An exposure device for the manufacture of cathode-ray tubes for displaying colored pictures comprises an elongate light source shaped so that the amount of light radiated by said light source increases linearly from zero at the ends of the light source to a maximum at the center of the light source, so that a triangular light profile is obtained. The device may be used to manufacture cathode-ray tubes wherein the display screen is composed of triplets of phosphor lines of very constant width.

3 Claims, 11 Drawing Figures

EXPOSURE DEVICE FOR THE MANUFACTURE OF CATHODE-RAY TUBES FOR DISPLAYING COLORED PICTURES AND CATHODE-RAY TUBE MANUFACTURED BY MEANS OF SUCH A DEVICE

The invention relates to an exposure device for the manufacture of cathode-ray tubes for displaying colour pictures. Such a device comprises an elongate light source extending parallel to the elongate apertures in the colour selection electrode, of a length adequate for exposing photo-sensitive material on the screen of the tube. The device of this type also includes means for controlling the emission of light from the source and a correction lens or a correction lens system between the light source and the colour selection electrode.

The invention also relates to a cathode-ray tube for displaying colour pictures manufactured by means of the said device.

Such an exposure device is described in Netherlands patent application No. 7311445 laid open to public inspection and is used for the manufacture of colour television tubes consisting of a glass envelope comprising three electron guns arranged beside each other in a row, a display screen which comprises a phosphor pattern and a colour selection electrode in front of said display screen. The phosphor pattern in such a tube consists of parallel vertical stripes of alternately blue, red and green luminescing phosphor and may include stripes of light-absorbing material between the phosphor stripes. The colour selection electrode, arranged immediate in front of the display screen has long narrow apertures extending parallel to the phosphor stripes and separated by ridges. The electron beam originating from the electron guns pass through the apertures and then impinge upon the phosphor stripes of the display screen. The colour selection is obtained by causing the electron beam originating from one given electron gun to impinge upon phosphor lines of one colour. This can be done by inclining the three electron beams at a small angle to each other, the so-called colour selection angle, and by locating the apertures in the colour selection electrode at accurately determined position with respect to the phosphor stripes. However, a number of problems still occur during the manufacture of such tubes, in particular in the provision of a phosphor pattern with phosphor lines spaced at a uniform distance from each other and having a given uniform and continuous width. The phosphor pattern is obtained by providing on the display screen a layer which comprises photosensitive material for example, a photolacquer with phosphor. The photosensitive layer is then exposed through the colour selection electrode to light from a sufficiently long elongate light source positioned at a predetermined location and thereafter the layer is developed and fixed.

In the Netherlands patent application No. 7,311,445 the formation of small constrictions and widenings in the phosphor lines behind the said ridges is reduced, inter alia, by adapting the shape of the diaphragm of the light source to control the emission of light from the source. This is done, for example, by using a diaphragm which passes more light at the ends than in the center. It has been found, however, that this measure is unsatisfactory since small constrictions, widenings and other irregularities in the phosphor lines still occur. This is the case, in particular, when the elongate light source is not tilted.

It is the object of the invention to provide an exposure device which makes it possible to expose the entire display screen at once without tilting of the light source and which produces very uniform phosphor lines.

According to the invention, an exposure device of the kind mentioned in the first paragraph includes means for controlling the amount of light emitted per unit length of the light source in a manner such that the light decreases substantially linearly from a maximum at the effective center to substantially zero at the effective ends of the light source so that a triangular light intensity profile is obtained. The effective ends of the source are the most widely spaced points on the source from which light is emitted towards the screen for at least part of the exposure and the effective center is mid-way between the effective ends.

The invention is based on the recognition that the ends of the projections of such an elongate light source having a triangular light profile and being projected on the display screen via a correction lens and each aperture in the colour selection electrode merge into each other much more smoothly so that a substantially continuous light distribution is obtained.

A light source having such a triangular light intensity profile can be obtained in a simple manner when the light source has at least a length 2l and is provided with a diaphragm having a rectangular aperture having a length l in the direction of the light source, which diagraphm is moved uniformly over a distance l between the ends of the light source. The movement of the light source may be a reciprocating movement.

A light source having such a triangular light distribution can also be obtained by the provision, around an elongate light source, of a diaphragm having a cylindrical sleeve which rotates about the axis of the elongate light source and which is provided with at least one aperture which is elongated in the longitudinal direction of the light source. The width of the aperture increases substantially linearly from the two ends towards the center. Such an aperture may, for example, be diamond-shaped or triangular. The diaphragm has to rotate to provide a triangular light distribution in each elemental portion of the angle subtendet at the source by the screen in a plane substantially perpendicular to the source.

It is also possible to obtain a triangular light profile by providing around or in front of the light source an optical filter, the light transmission of which increases substantially linearly from the ends of the light source towards the center.

It is alternatively possible to provide in front of or around the elongate light source a diaphragm which has a large number of slot-like apertures situated at a small distance from each other in the longitudinal direction of the light source and extending substantially at right angles to the longitudinal direction of the light source, with the width of the apertures increasing from the ends of the diaphragm towards the center. The apertures are preferably situated at a distance of approximately 1 mm or smaller from each other and the width of the slots increases linearly from 0.1 mm or smaller at the ends of the diaphragm to 1 mm or smaller in the center of the diaphragm.

The invention will now be described in greater detail with reference to the drawings, in which.

Figure 1:
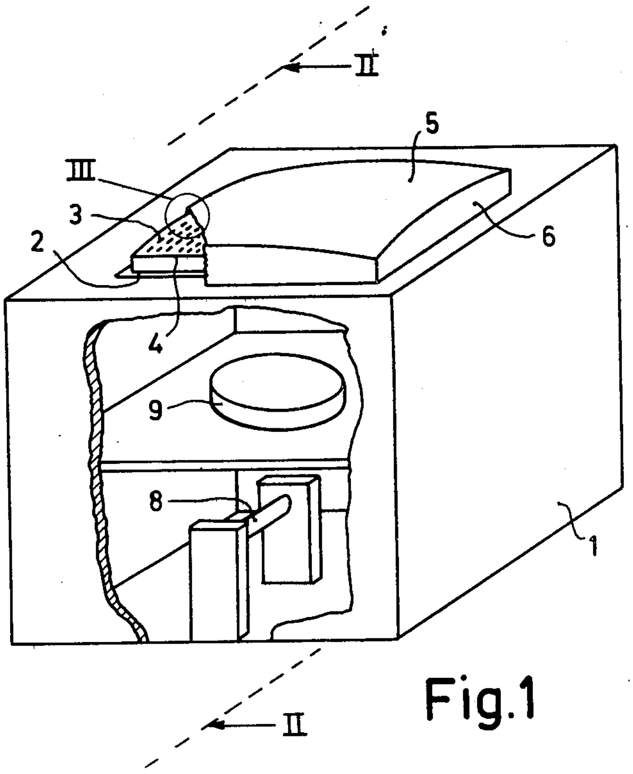
FIG. 1 shows diagrammatically an exposure device according to the invention.
Figure 2:
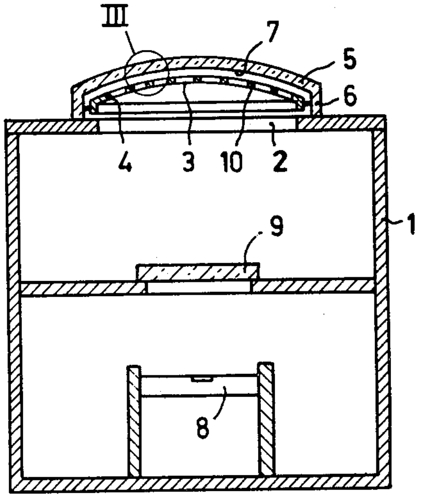
FIG. 2 is a sectional view through the exposure device.
Figure 3:
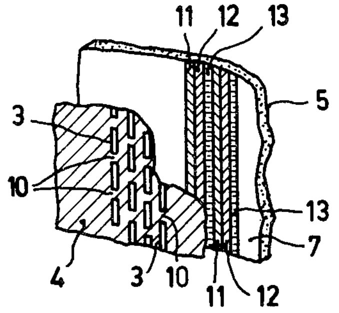
FIG. 3 shows diagrammatically the formation of phosphor lines.

FIG. 1 shows diagrammatically an exposure device according to the invention. It comprises a box-shaped housing 1 which has an aperture 2 on its upper side. A colour selection electrode 4 having elongate apertures 3 is secured to an upright edge 6 within a curved display window 5. The inner surface 7 (see FIG. 2) of the display window 5 facing the aperture 2 is covered with a phosphor-containing photolacquer (not shown). The colour selection electrode 4 is arranged in the display window 5 in the same manner as in the operating cathode-ray tube. At the bottom of the exposure device is positioned an elongate light source 8 extending parallel to the elongate apertures in the colour selection electrode. The length of the light source 8 is determined, inter alia by the distance between the colour selection electrode and the display window, the distance from the light source to the display window and the distance between two successive slot-shaped apertures in a vertical row separated by a ridge. In such devices a high pressure mercury vapour discharge lamp is frequently used. During the exposure of the photosensitive layer consisting of phosphor-containing photolacquer, the light passes through the correction lens 9 and the apertures 3 in the colour selection electrode 4 and impinges on the photolacquer, as shown in FIG. 2. Since an elongate light source 8 is used, a quantity of light also falls behind the ridges 10 between the apertures 3 in the colour selection electrode 4 so that stripe-shaped phosphor regions will be formed after developing the exposed layer. When the exposure process is repeated three times with photolacquers containing successively phosphors of a different colour, phosphor lines 11, 12 and 13 of a phosphor luminescing in a different colour will be formed, as is shown in FIG. 3. After each exposure the light source is moved over a small distance parallel to the display screen and at right angles to its longitudinal direction, so that the various phosphor lines are formed beside each other. The whole display window is covered in this manner with such triplets of stripes and thus forms the display screen.

Figure 4:
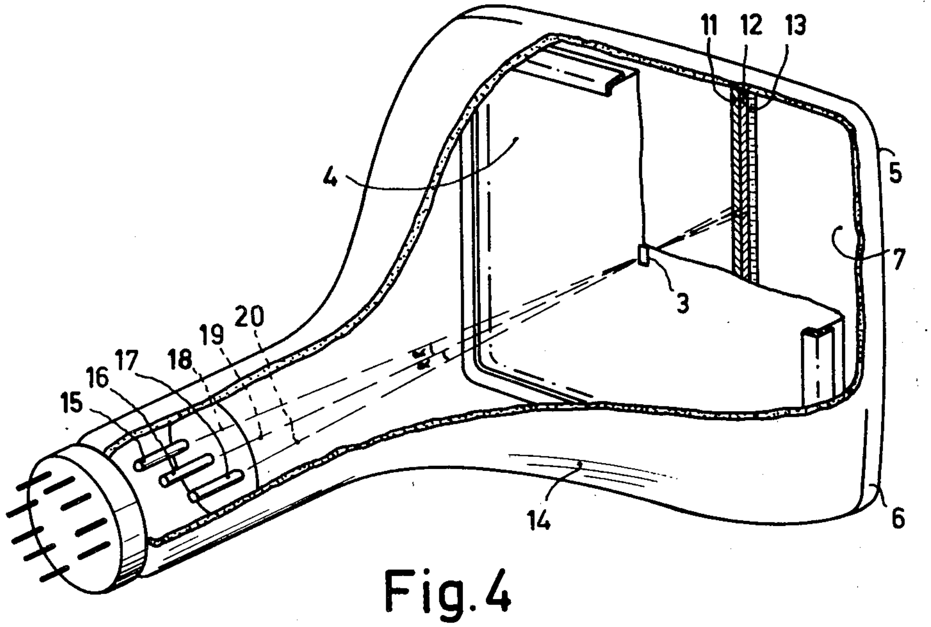
FIG. 4 shows a cathode-ray tube manufactured by means of the device.

FIG. 4 shows a cathode-ray tube manufactured by means of a device according to the invention. In the neck of a glass envelope 14 are positioned three electron guns 15, 16 and 17 which are in alignment and produce electron beams 18, 19 and 20. The side 7 of the display window 5 is covered with triplets of phosphor lines 11, 12 and 13 which form the display screen. The electron beams 18, 19 and 20 pass through an aperture 3 in the colour selection electrode 4 at an angle, the so-called colour selection angle $\alpha$, and thus each impinges only upon phosphor lines of one colour. For example, the electron beam 20 originating from electron gun 17 always impinges on phosphor lines 11 of the display screen so that the colour selection is obtained. For the colour purity of the cathode ray tube it is very important that the phosphor lines 11, 12 and 13 have a very uniform width without widenings, constrictions or other irregularities either behind the ridges 10 of the colour selection electrode 4.

Figure 5:
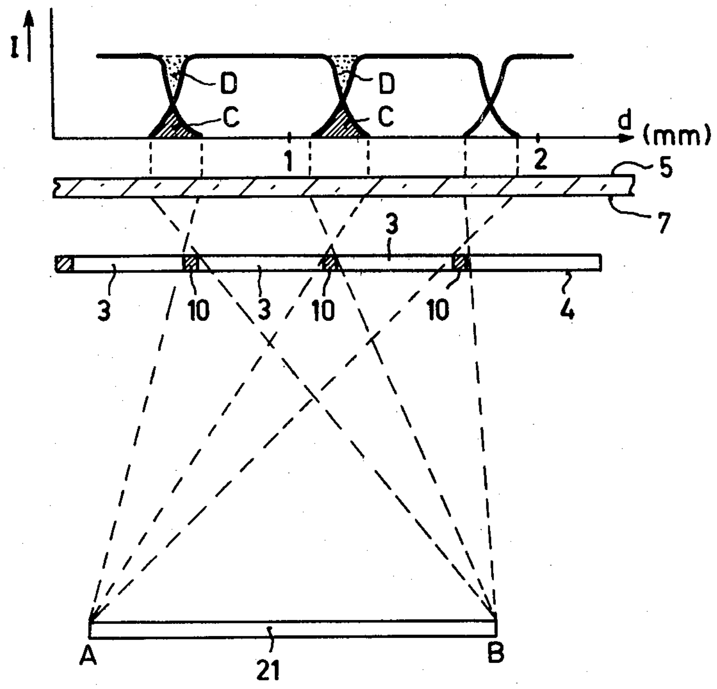
FIGS. 5, 6 and 7 show light intensity distributions.
Figure 6:
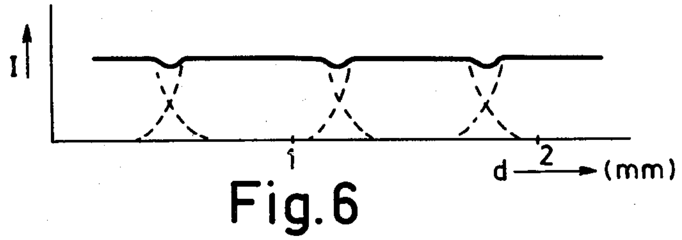

FIG. 5 shows diagrammatically a known exposure device in which an elongate light source 21 radiates an equal quantity of light throughout its length. The light of such an elongate light source 21 passes through the apertures 3 of the colour selection electrode 4, which apertures are separated by ridges 10. The apertures 3 are reproduced on the side 7 of the display window 5 covered with a phosphor-containing photolacquer. The light contribution behind each ridge 10 during the exposure consists of light which falls through two adjacent apertures 3. When the quantity of light impinging upon the surface 7 behind a ridge is substantially equal to the amount of light which falls on the surface 7 opposite an aperture 3 phosphor stripes of uniform width without irregularities are formed. This would be the case when the amount of light represented by area C is approximately equal to the amount of light represented by area D, as is shown in the graph of this Figure. The light intensity variation I in this and following graphs is shown in arbitrary units as a function of the place behind a row of apertures 3 separated by ridges 10. Since the distance from the light source 21 to the display screen and the distance from the colour selection electrode 4 to the display screen is not constant at every part of the screen, irregularities in the light distribution behind the ridges 10 will nevertheless occur during the exposure with such a light source radiating an equal quantity of light throughout its length and result in constructions and widenings of the phosphor lines. Such errors also occur because of small differences in the variation of the distance from the colour selection electrode to the display screen for each individual tube. The irregularities in the light intensity are shown in FIG. 6.

Figure 8:
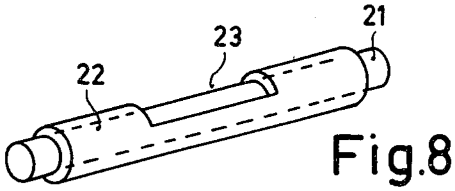
FIG. 8 shows diagrammatically a light source as it has so far been used.

FIG. 8 shows diagrammatically a light source as it has so far been used. Arranged around a high pressure metal vapour lamp 21 is a diaphragm 22 having an aperture 23 which determines the length of the elongate light. This length usually is a number of times 15 to 25 mm dependent on, inter alia, the dimensions of the display screen to be manufactured. As is known from the German published patent application No. 2405979, the length l of the light source is determined by the formula $$l = na_v L/q,$$

wherein n is an integer, $a_v$ is the distance between the centers of two successive apertures separated by a ridge, L is the distance from the light source to the display screen and q is the distance between the colour selection electrode and the display screen.

Figure 7:
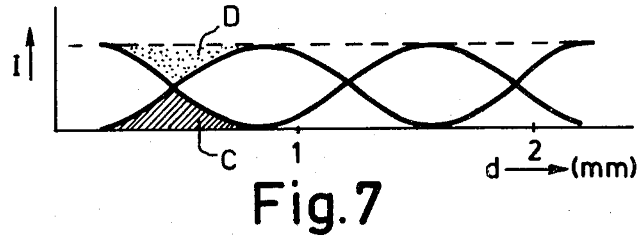
Figure 9:
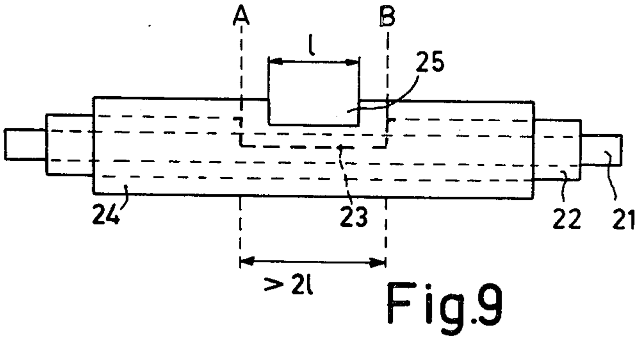
FIGS. 9 to 11 show other embodiments of the light source.
Figure 10:
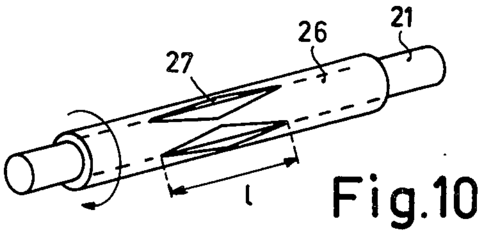
Figure 11:
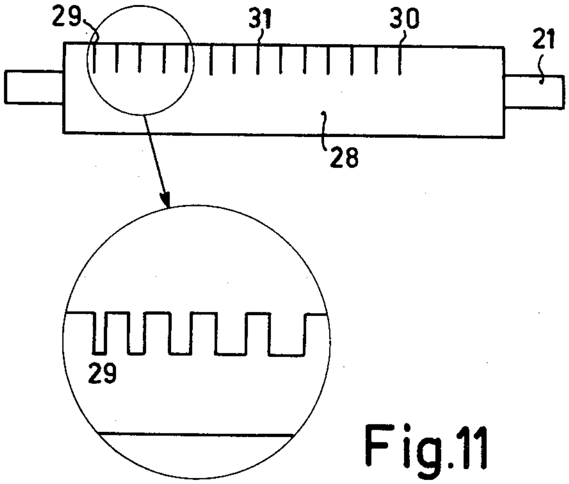

In light sources having a triangular light profile according to the invention as is shown in FIGS. 9 to 11, a light intensity variation behind the apertures and ridges occurs as shown in FIG. 7. In this case the length of the light source should also be chosen to be sufficiently long so that the area C in the graph of FIG. 7 is approximately equal to the area D. Since, however, the edges of the light distributions behind each aperture are much less steep, the light distributions behind each aperture merge into each other much more smoothly and a substantially continuous light distribution is obtained.

FIG. 9 shows an arrangement for obtaining an elongate light source with a triangular light profile. For that purpose there is arranged around a light source such as that shown in FIG. 8, a second diaphragm 24 having an aperture 25 of length l, which diaphragm 24 is moved uniformly over a distance l. This may be one movement or a reciprocating movement. The diaphragm may be moved mechanically or manually.

FIG. 10 shows another arrangement for obtaining a light source with a triangular light profile. Arranged around an elongate light source 21 is a diaphragm 26 having diamond-shaped or triangular apertures 27. In order to obtain a regular triangular light distribution, the diaphragm 26 is rotated around the light source 21 in the direction of the arrow.

Another arrangement for obtaining an elongate light source having a triangular light profile is shown in FIG. 11. In this construction a diaphragm 28 is provided around or in front of elongate light source 21. The diaphragm 28 has slot-like apertures which are arranged at a regular distance from each other (for example 1 mm). The width of the slot-shaped apertures increases linearly from the slots 29 and 30 at the ends towards the slot 31 in the center (for example, 0.1 mm at the ends and 1 mm in the center). It has been found that such a diaphragm which is constructed from discrete slots nevertheless results in the desired linear variation of the light distribution.

Such light sources can successfully be used in exposure devices of the type shown in FIG. 1 and also in exposure devices in which the light source is tilted so that it always remains parallel to the part of the display screen then being exposed, as has been described in Netherlands patent application No. 7,311,445 laid open to public inspection.

What is claimed is:

1. In an exposure device for the manufacture of colour cathode-ray tubes having a colour selection electrode and display screen which comprises an elongate light source, extending parallel to the elongate apertures in the colour selection electrode, for exposing photosensitive material on the screen, means for controlling the emission of light from said source and a correction lens or lens system between the light source and the colour selection electrode; the improvement wherein said means comprises a diaphragm provided with a large number of slot-like apertures positioned at a distance of approximately 1 mm from each other in the longitudinal direction of the light source, said apertures extending substantially at right angles to the longitudinal direction of the light source and the width of said slot-like apertures increasing linearly from 0.1 mm at the ends of the diaphragm to 1 mm in the centre of the diaphragm for controlling the amount of light emitted per unit length by the light source to decrease substantially linearly from a maximum at the effective centre to substantially zero at the effective ends of the light source so that a triangular light profile is obtained.

2. In an exposure device for the manufacture of a colour cathode-ray tube having an apertured colour selection electrode and a display screen, which comprises an elongate light source extending parallel to the elongate apertures in the colour selection electrode for exposing photosensitive material on the screen, means for controlling the emission of light from said source and a correction lens or lens system between the light source and the colour selection electrode; the improvement wherein said means includes a cylindrical diaphragm rotatable about said light source, said diaphragm having a longitudinally extending aperture of a width which increases substantially linearly from zero at the ends to a maximum at the center of said aperture to substantially linearly decrease the amount of light emitted per unit length by said light source from a maximum at the effective center to substantially zero at the effective ends of the light source so that a triangular light profile is obtained.

3. In an exposure device for the manufacture of a colour cathode-ray tube having an apertured selection electrode and a display screen which comprises an elongate light source extending parallel to the elongate apertures in the colour selection eletrode for exposing photosensitive material on the screen, means for controlling the emission of light from said source and a correction lens or lens system between the light source and the colour selection electrode; the improvement wherein said light source has at least a length 2 l and said means includes a diaphragm with a rectangular aperture having a length l, said diaphragm being movable uniformly between the ends of the light source over a distance l to substantially linearly decrease the amount of light emitted per unit length by said light source from a maximum at the effective center to substantially zero at the effective ends of the light source so that a triangular light profile is obtained.

* * * * *